May 11, 1954 H. E. VAUGHAN 2,678,435

SIGNAL SENDER COMPRISING MOTOR DRIVEN CAPACITATIVE COMMUTATOR

Filed Sept. 27, 1950 2 Sheets-Sheet 1

INVENTOR
H. E. VAUGHAN
BY R. O. Covell
ATTORNEY

May 11, 1954 H. E. VAUGHAN 2,678,435

SIGNAL SENDER COMPRISING MOTOR DRIVEN CAPACITATIVE COMMUTATOR

Filed Sept. 27, 1950 2 Sheets-Sheet 2

INVENTOR
H. E. VAUGHAN
BY R. O. Corell
ATTORNEY

Patented May 11, 1954 2,678,435

UNITED STATES PATENT OFFICE 2,678,435

SIGNAL SENDER COMPRISING MOTOR DRIVEN CAPACITATIVE COMMUTATOR

Henry E. Vaughan, Chatham, N. J., assignor to Bell Telephone Laboratories, Incorporated, New York, N. Y., a corporation of New York Application September 27, 1950, Serial No. 186,932

2 Claims. (Cl. 340—354)

This invention relates to signaling systems and particularly to systems in which selective signals are transmitted by coded electrical current impulses.

Objects of the invention are the rapid transmission of selective signals consisting of coded electrical current impulses and simplification of the apparatus required for transmitting such signals.

In signaling systems arranged to transmit signals consisting of coded electrical current impulses, it is known to employ electronic means for scanning variably settable registers to effect the transmission of signals corresponding to a plurality of registered items of information, one such system being disclosed in application Serial No. 158,218, filed by W. A. Malthaner and H. E. Vaughan, April 26, 1950. The signal transmitter in the Malthaner-Vaughan application consists of a coding stepper circuit, a digit stepper circuit and an oscillator-modulator circuit, each of these circuits comprising a plurality of electronic tubes. Studies of high speed repetitive digit signaling in automatic telephone systems indicate that the holding time of transmitting equipment is much greater than the holding time of receiving equipment, and consequently a larger number of transmitters are required per office; wherefor it becomes important that each signal transmitter be not only reliable but also relatively inexpensive.

The invention is a signal transmitter comprising an electrostatic commutator, for scanning the registers on which the signals which are to be transmitted are registered according to a predetermined code, and an oscillator-modulator circuit controlled by the commutator to transmit corresponding coded signal impulses. A feature of this invention is a signal transmitter comprising a single mechanically driven capacitor plate which is used to scan a plurality of fixed capacitor plates, certain of which are marked by a voltage of a particular frequency under control of an associated digit register. The voltage impulses produced on the scanning plate by continuous scanning of the fixed plates constitute pulse code modulated signals which are amplified and transmitted over a line or trunk to a signal receiver such as that disclosed in the aforementioned Malthaner-Vaughan application. The envelope of the alternating-current signal impulses is determined by the speed of the commutator and the shape of both fixed and moving capacitor plates, and a feature of the invention is the shaping of the signal envelope so that its frequency components lie within the desired transmission band without the use of transmitting filter networks. It may be noted that this means of modulation permits control of the amplitude-time characteristic of the signal envelope without the attendant phase distortion generally encountered when such control is secured with filters.

Figure 1:
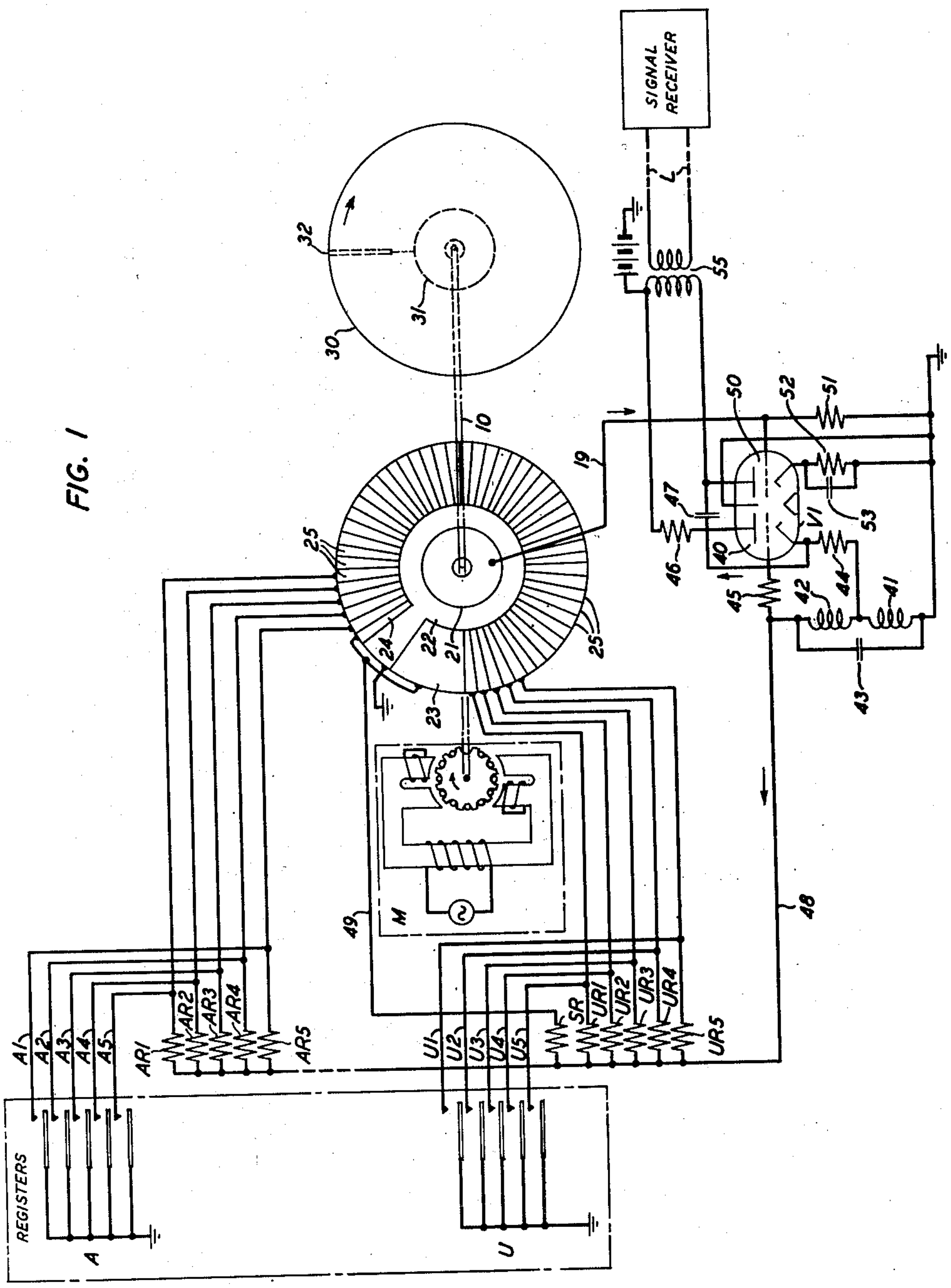
Figure 4:
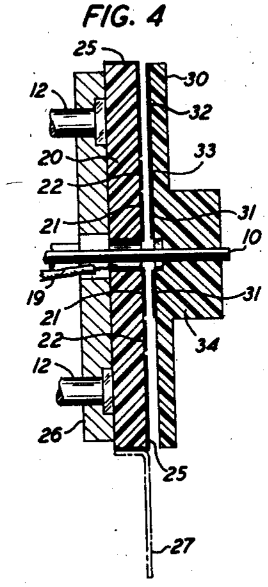

The drawing which forms a part of this specification discloses a signal transmitter arranged, in accordance with this invention, to cyclically transmit a start and synchronizing signal followed by pulse code modulated digit signals, one for each of ten digits. Referring to the drawing, Fig. 1 represents schematically the registers on which the digital information to be transmitted is stored, a capacitative scanner and an oscillator-amplifier circuit; and Figs. 2, 3 and 4 show the details of the structure of the capacitative scanner.

Figure 2:
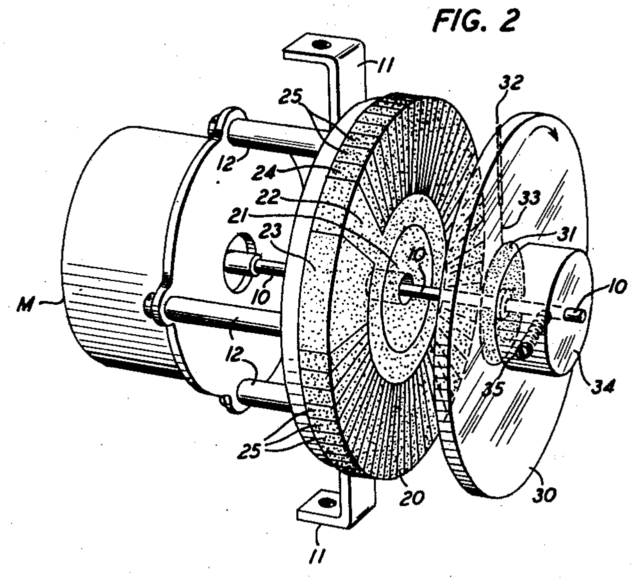

As shown in Fig. 2, the scanner comprises a motor M, two circular discs 20 and 30 of insulating material, such as glass, which together with a mounting bracket 11 form a demountable unit. The motor M is a 600-R. P. M. synchronous motor of known design, and is connected to a 110-volt power source, not shown. The disc 20 is three inches in diameter and one quarter of an inch thick and is cemented to an aluminum or other metal supporting plate 26 fixed by the lugs 12 to the motor housing. The shaft 10 of the motor M extends through a small hole at the center of the discs 26 and 20. The rotating disc 30, which is fixed on the free end of the motor shaft 10, is three inches in diameter and one-eighth of an inch thick and has a hub 34 of like material integral therewith or cemented thereto. A set screw 35 in hub section 34 fixes the disc 30 on the shaft 10. Fig. 3 shows a horizontally disposed mounting board 29, mounted on a supporting frame (not shown). The board 29 has a circular hole in the middle into which the fixed disc 20 is positioned flush with the top of the board, the mounting bracket 11 of the motor and disc unit being fastened to the frame which also supports the mounting board 29.

Figure 3:
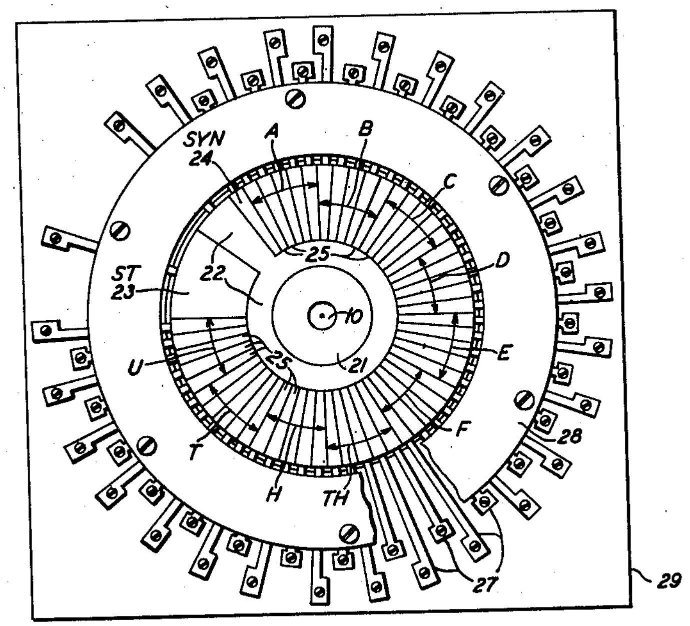

The fixed disc 20 carries on its surface opposing the disc 30, a hub capacitor plate 21, a guard ring plate 22, start and synchronizing signal plates 23 and 24 and fifty code capacitor plates 25 as shown particularly in Figs. 2 and 3. All of these plates with the exception of the circular hub plate 21 cover a segment of the circle and extend over the periphery of the disc 20 as shown in Fig. 4. The guard ring plate 22 is grounded and separates the hub plate from the code plates to prevent interference due to pick-up between the hub and code plates. The hub capacitor plate 21 is one inch in diameter and extends down into the center hole, through which the shaft 10 passes, and enables connection of the conductor 19 thereto as shown in Fig. 4. To form the capacitor plates on disc 20, the surface and periphery of disc 20 are coated with a silver paste which is permitted to air dry. The lines separating the various rings and plates are then marked and scribed with the aid of a dividing head. In scribing, sufficient material is removed to make dividing lines from .005 to .010 inch wide with all waste carefully removed. The disc is then heat treated and annealed, and is then cemented to the aluminum plate 26.

The rotating disc 30 carries on its surface a hub capacitor plate 31 opposing the hub capacitor plate 21 on disc 20 and a scanning capacitor plate 32 adapted to successively oppose the capacitor plates 23, 24 and 25 of disc 20. The capacitor plates 31 and 32 are formed on disc 30 in similar manner to that in which capacitor plates are formed on disc 20, as above described. The scanning plate 32 is rectangular and covers a segment approximately 1.5 degrees in width, about one-fourth the width of a code plate 25, and is electrically connected to the hub plate 31 by a line 33 of conducting paint or paste similar to that of the plates 31 and 32.

The start signal plate 23 occupies a space equal to six code plates 25, the guard ring segment 22 occupies a space equal to three code plates 25 and the synchronizing signal plate 24 occupies a space of one code plate 25. The opposing surfaces of the discs 20 and 30 are machined within ±.005 inch in planes perpendicular to the shaft 10; and there is a running clearance of .003 inch between the opposing surfaces of the discs 20 and 30. In Fig. 2, the disc 30 is shown as being separated from disc 20 by about an inch, but this is merely to more clearly show the capacitor plates formed on the opposing surfaces of the two discs 20 and 30. During a revolution, the scanning plate forms a condenser of approximately 2 micromicrofarads successively with each of plates 23, 24 and 25. The stationary and rotating hub capacitor plates 21 and 31 continuously form a condenser of approximately 30 micromicrofarads in series with scanning plate 32. With the motor running 600 revolutions per minute, one revolution takes 100 milliseconds, wherefore each code plate 25 is 1.67 milliseconds in length.

It is apparent that the width of each fixed code element plate 25 is primarily dependent on the size of the fixed disc 20. However, the relative sizes and shapes of the code element plates 25 and scanning plate 32 is a matter of design to effect a desired shaping of the envelope of the transmitted signal current impulses without using filter networks in the output circuit. In the transmitter shown in the drawing, the scanning plate 32 is rectangular in shape, its length being equal to the radial length of the fixed plates and its width being approximately one fourth of the average width of a code element plate 25; and the envelope of each code impulse of signaling current is approximately bell-shaped in both positive and negative amplitudes, with the amplitude equal to or greater than one-half the maximum amplitude for a predetermined minimum time interval necessary to assure satisfactory signal transmission. These relative plate sizes, together with the well-known aperture effect and fringing effects as the scanning plate approches and recedes from each code element plate, produce signal impulses which are subject to substantially no distortion when transmitted over present-day, commercially used, toll telephone lines. Such an impulse has a frequency spectrum maximum at the carrier current frequency and decreasing practically to zero at sideband frequencies. It is apparent that similar code impulses could be produced if the relative sizes of the fixed code plate and scanning plate were reversed, that is with more widely separated, narrow fixed code plates and a wider scanning plate. It is particularly to be noted that the shape of either the scanning or the fixed code plates may be varied to produce a more gradual or a steeper envelope wave form, any desired shaping being more readily obtainable by plate shaping than by using transmitting filter networks.

It is, of course, apparent that other methods may be used to form the capacitor plates on the discs 20 and 30, that the start and synchronizing signal plates may be varied in spacing and length, and that the number of code plates may conform to any desired code and number of digits.

In Fig. 3 the ten groups of code plates 25 are designated A, B, C, D, E, F, TH, H, T and U corresponding to the ten registers which store the signals to be transmitted. These registers may be of the usual relay storage type, variably actuated by incoming digit signals of any known type; and the relays of each register are arranged, when a digit is stored thereon, to connect ground to three of the five associated code conductors which connect to code plates 25 of the scanner, the code used being of the well-known two-out-of-five type. In Fig. 1 only the first and last of these registers, the A register and the U register, are shown; and each of these is schematically represented by five contacts which are variably actuated by the relays (not shown) of the register to connect ground to three of the five conductors which are connected to corresponding digit code plates 25 of stationary disc 20. These conductors for the A register are designated A1, A2, A3, A4 and A5; the conductors for the U register are designated U1, U2, U3, U4, and U5; and the conductors for the eight intermediate registers would be correspondingly designated if shown. While these conductors could be permanently connected to the code plates 25 on the periphery of the disc, the arrangement shown in Figs. 3 and 4 is one in which the conductors are connected to Phosphor bronze springs 27 fixed in a circle on the upper face of the mounting board 29, the inner end of each spring being bent over approximately 90 degrees to engage one of the code plates 25 on the periphery of disc 20. Like springs engage the start signal plate 23, the ground ring plate 22 and the synchronizing signal plate 24. A ring 28 of insulating material is fastened by screws to the board 29 covering the middle portions of the springs 27, the outer ends of which form lugs with screws therein for attaching the above-mentioned conductors from the registers, the conductor which supplies ground potential to the guard ring 22 and the conductor 49 which supplies carrier frequency potential to the start and synchronizing signal plates 23 and 24.

The oscillator 40 of tube V1 is a modified Hartley type oscillator which generates signaling current at a frequency of 1200 cycles per second, which is the carrier frequency of the double sideband signaling channel. The output of the oscillator is applied through conductor 48, isolating resistances, such as AR1 to AR5 and UR1 to UR5, to the code element plates 25. For the ten-digit transmitter shown, there are thirty grounded code element plates 25 for any registration; and there is a constant load on the oscillator. As the rotating scanning plate 32 passes over an energized code segment plate, signaling current is transmitted through the condenser formed by these plates and through the condenser formed by the hub capacitor plates 21 and 31, through conductor 49 to the grid of the amplifier 50. Thus each revolution of the scanning plate 32 effects the successive transmission of a start signal impulse, a synchronizing signal impulse, and ten digit signals, each consisting of two impulses. Each signal impulse of 1200-cycle carrier current is transmitted through amplifier 50, transformer 55 and line L to a distant signal receiver, which may be similar to that disclosed in the aforementioned Malthaner-Vaughan application. The condenser 47 has a capacity which substantially neutralizes the capacitative leak of the capacitative scanner and associated wiring.

The scanner may be common to a plurality of register sets and be individually connected to any set, when required. Since the scanner is continuously rotating, the output circuit of amplifier 50 may be closed, when the registers with which the scanner is associated have all been set, in a manner similar to that shown in the aforementioned Malthaner-Vaughan application.

What is claimed is:

1. In combination, a plurality of variably settable digit registers, a source of alternating current of a particular frequency, a motor driven capacitative commutator comprising a plurality of fixed stationary plates and a single movable scanning plate movable into position opposing each fixed plate in succession, and means including said source and said commutator for cyclically transmitting, in the order named, start, synchronizing and digit signals consisting of impulses of current from said source, each digit signal consisting of a predetermined number of current impulses, variably positioned in a plurality of impulse positions of equal and predetermined duration according to the value of the digit registered on the corresponding digit register, the fixed plate for transmitting the start signal current impulse being larger than each fixed plate for transmitting a digit signal current impulse so as to effect the transmission of a start signal the duration of which is distinguishably longer than that of four immediately successive digit signal current impulses.

2. In a signaling system, a variably settable digit register, an outgoing signaling channel, a source of carrier current of predetermined frequency, modulating means for effecting the transmission of double side-band carrier current impulses over said channel, said modulating means comprising a plurality of stationary electrically conductive code plates, a single rotatable electrically conductive scanning plate, means for moving said scanning plate at a predetermined rate into position opposite each one of said code plates in succession to successively form a condenser with each code plate, another electrically conductive plate electrically connected to and rotatable with said scanning plate and another stationary electrically conductive plate continuously opposing said other rotatable plate to form another condenser, means for connecting said carrier source to certain ones of said plurality of code plates according to the setting of said register, and means comprising amplifying means connecting said other stationary plate to said outgoing channel.

References Cited in the file of this patent

UNITED STATES PATENTS

| Number | Name | Date |
|---|---|---|
| 1,683,090 | Mirick | Sept. 4, 1928 |
| 1,812,828 | Gray | June 30, 1931 |
| 1,813,913 | Clikey et al. | July 14, 1931 |
| 1,930,525 | Levy | Oct. 17, 1933 |
| 2,147,948 | Kent | Feb. 21, 1939 |